Figure 1:
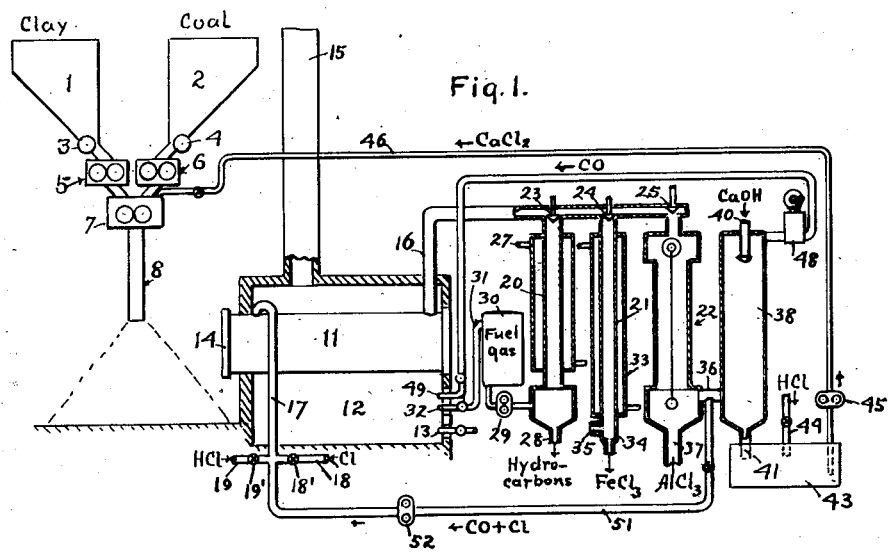

Mar. 3, 1925.

E. R. WOLCOTT 1,528,039

PROCESS FOR MANUFACTURING ALUMINUM COMPOUNDS

Filed April 14, 1920

INVENTOR.
Edson R. Wolcott
BY Arthur P. Knight
ATTORNEY.

Patented Mar. 3, 1925.

1,528,039

UNITED STATES PATENT OFFICE.

EDSON R. WOLCOTT, OF LOS ANGELES, CALIFORNIA, ASSIGNOR, BY MESNE ASSIGNMENTS, TO THE TEXAS COMPANY, OF NEW YORK, N. Y., A CORPORATION OF TEXAS.

PROCESS FOR MANUFACTURING ALUMINUM COMPOUNDS.

Application filed April 14, 1920. Serial No. 373,778.

*To all whom it may concern:*

Be it known that I, EDSON R. WOLCOTT, a citizen of the United States, residing at Los Angeles, in the county of Los Angeles and State of California, have invented a new and useful Process for Manufacturing Aluminum Compounds, of which the following is a specification.

This invention relates to the recovery of aluminum chloride, or other aluminum compounds, from clay, bauxite, shale, or other material containing silicate of aluminum, or oxygen containing aluminum compounds, with or without other constituents.

An important object of the present invention is to provide for treatment of clay, shale, etc., which does not naturally contain carbonaceous material in sufficient quantity to furnish the carbon required for the decomposition of the silicate, or the conversion of the silicate to the form of chloride, or other desired salt.

My invention provides for the utilization of such silicates by adding thereto carbonaceous material capable of producing on destructive distillation sufficient hydrocarbon to furnish all, or a considerable portion of the fuel required for carrying on the process and sufficient residual carbon to effect in the presence of chlorine the production of aluminum chloride from the aluminum silicate content of the material. This carbonaceous material may consist, for example, of coal, asphaltic material or low grade petroleum. The mixture of carbonaceous material and oxygen-containing aluminum compound is subjected to a preliminary distillation to drive off the volatile constituents, or hydrocarbons contained in or produced from such carbonaceous material, leaving the residue of carbon mixed with the silicious material, in suitable condition for production of aluminum chloride, or other salt therefrom, by a chloridizing volatilization operation, or similar operation.

My invention is intended particularly for the production of aluminum chloride, or other halide, either pure or mixed with other chlorides, or of a double chloride of aluminum and other metals, for example, of sodium and aluminum and the chloride or halide salt thus produced may be utilized in any suitable manner, for example, in the dye industry, or in petroleum refining, or it may be subjected to further treatment for the production of aluminum therefrom in well known manner.

Another object of my invention is to provide for recovery of the fume and gaseous constitutents passing from the retort including chlorine and combustible gases, particularly carbon monoxide.

A further object of the invention is to provide for cyclic operation of the process in such manner as to effect rapid production of aluminum chloride by the use of excess chlorine in the retorting operation and to provide for recovery and re-use of the excess chlorine so as to carry out the process in the most economical manner.

Another object of the invention is to provide for carrying out the process in such manner as to dispense as far as possible with the use of any fuel other than what is produced by the operation of the process itself. For this purpose my invention provides for recovery and use as fuel of hydrocarbons passing from the heating retort and of carbon monoxide produced by the reactions in such retort, utilizing the heat so produced in carrying out the heating operation in such retort.

In the accompanying drawings, Fig. 1 illustrates diagrammatically an apparatus suitable for carrying out my invention, this figure illustrating the use of chlorine as a chloridizing agent.

Figure 2:
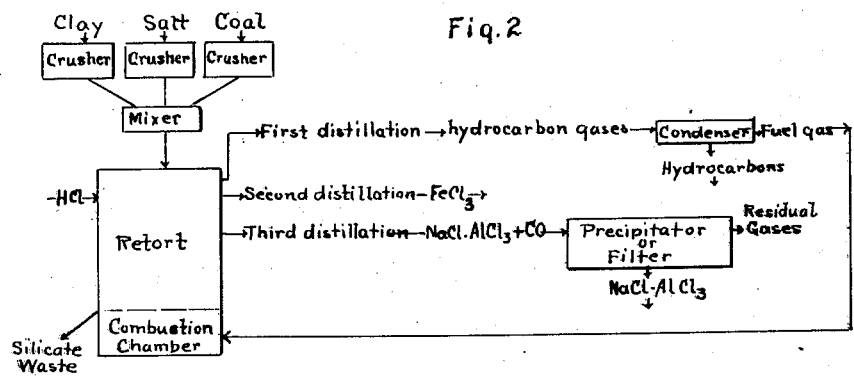

Fig. 2 is a flow sheet of an embodiment of the invention of the process in which sodium chloride is used as a chloridizing agent.

The apparatus shown in Fig. 1 comprises a bin 1 for storage and delivery, for example, of the clay or argillaceous material, and a bin 2 for storage and delivery of the carbonaceous material, such as coal, saw-dust, brea, or other material sufficiently high in carbon content to serve the purpose of this invention. The respective bins 1 and 2 are provided with feeding means 3 and 4 for feeding the silicious material to suitable crushing or grinding means, indicated at 5 and 6, which discharge the ground material to a mixer, indicated at 7, the mixed material being delivered through outlet 8 to suitable storage means, here indicated as a charging floor from which the retort hereinafter described may be charged, either by hand or automatically by suitable means in the usual manner of coke or gas retorts.

A retort, indicated at 11, is mounted in a combustion chamber, or furnace 12, which is heated by a burner 13 so as to heat the contents of the retort 11 to the required high temperature, said furnace having an outlet stack, indicated at 15. The retort 11 is provided with a charging door 14 which may be opened or removed to permit charging of the retorts with the material to be treated and said retort is further provided with an outlet pipe 16 through which the gas and fume produced in the retort may pass to suitable means for treatment further as hereinafter described.

In the form shown in the drawings, the retort is of the horizontal type and is made of silica, or other suitable material, so as to withstand the high temperature and the action of the chemical agents. Suitable means, such as inlet pipe 17 is provided for supplying the chloridizing agent, for example, chlorine, to the interior of the retort 11, such agent being drawn from a pipe 18 provided with a valve 18'; another pipe 19 provided with a valve 19' may connect with the pipe 17 to deliver hydrochloric acid gas thereto, as hereinatfter described.

The outlet pipe 16 leads to suitable means for separating and recovering the several constituents of the gases and fumes passing off from the retort 11. Such means may comprise several recovery devices 20, 21 and 22, connected to the outlet pipe 16 through valves 23, 24 and 25, so that said recovery devices may be brought into operation successively or alternatively. The device 20 consists of a condenser having suitable means 27 for circulating cooling medium therethrough to cool the gases delivered from the outlet pipe 16, and the corresponding valve 23 being open during the first stage of the operation so that the hydrocarbons produced in such first stage are partly condensed in the device 20 and pass off through an outlet 28, the residual or uncondensed gases being forced by pump 29 to a receiver 30 from which the pipe 31 leads to a burner 32 acting as an auxiliary burner to the burner 13 aforesaid.

The device 21 is for the purpose of removing the ferric chloride produced in a second stage of distillation and is provided with a means 33 for circulating cooling medium in contact therewith and with an outlet 34 for the ferric chloride and an outlet 35 for the residual gases.

The device 22 may consist of any suitable device for collecting or recovering the aluminum chloride produced in a third stage of the distilling operation. This device is illustrated as an electrical preciptator but it is understood that any suitable collection means may be used for this purpose.

The device 22 is provided with an outlet 37 for the condensed aluminum chloride and with an outlet 36 for conducting the residual gases to a washing tower or spray chamber 38 adapted for collection or removal of chlorine and hydrochloric acid gases. This device 38 is provided with means, indicated at 40, for supply of lime-water, or equivalent thereof, and with an outlet 41 through which the reaction product is discharged to a tank or sump 43. I prefer to provide in this connection means for converting the effluent gases from the spray chamber 38 to the form of calcium chloride, or equivalent material, for example, by supplying hydrochloric acid to this tank through a pipe 44 and the calcium chloride solution produced may be forced by pump 45 to a pipe 46 leading to the mixer 7 above described, so as to mix the calcium chlorid solution with the mixture of argillaceous material and carbonaceous material. The effluent gases from the spray chamber 38 may be forced by pump 48 to a burner 49 acting as an auxiliary burner in heating the chamber or furnace 12.

My process may be carried out in the above described apparatus as follows:

Clay, shale, or other rock, or material containing aluminum silicate, or other oxygen-containing aluminum compound, such as bauxite, or corundum, is supplied from the bin 1 to a crusher or grinder 5 and the finely ground material is mixed in the mixer 7 with suitably ground coal, brea, saw-dust, or other carbonaceous material.

The resulting mixture of finely divided oxygen-bearing aluminum compound and carbonaceous material is charged in the retort 11, either by hand or by the operation of suitable mechanical means, and said retort is then heremeticaly closed at the charging door 14 and is subjected to heat produced in the combustion chamber 12. In the case of shale, or argillaceous material containing an appreciable amount of iron compounds, I prefer to carry out the distillation of the material in three stages.

In the first stage, the heat applied to the retort 11 is such as to subject the carbonaceous material in the mixture to destructive distillation to drive off hydro-carbon compounds and other organic compounds, which pass out through the pipe 16 and are conducted to the condenser 20, valve 23 being opened and the valves 24 and 25 being closed at this time. Any water contained in the mixture will also be driven off in this operation, either before or during the volatilization of the hydrocarbons, and may be collected, together with or separately from the hydrocarbons. Condensed hydrocarbons may pass out through the outlet 28 to suitable storage means and the residual gases are pumped by the pump 29 to receiver 30 and delivered as fuel to the combustion chamber 12 through burner 32. If desired, all the hydrocarbons or organic compounds passing from the retort in this operation may be delivered directly to the burner 32 for combustion, as fuel. The carbonaceous material having been substantially freed of volatile matter, including hydrocarbons and water, in this first stage of distillation, the valve 23 is then closed and valve 24 is opened and hydrochloric acid gas, preferably with a trace of chlorine passed in the retort 11, for example, through pipes 19 and 17, the heat of the retort being maintained at such a degree as to cause reaction between the hydrochloric acid and the iron compounds present, resulting in the production of ferric chloride, or a double chloride of iron and aluminum, which passes off through the pipe 16 and is collected in the condenser 21, or is otherwise disposed of. This second stage of distillation results in the production in the retort of a substantially pure oxygen-containing compound of aluminum intimately mixed with residual carbon resulting from the destructive distillation of the carbonaceous material. This carbon so distributed throughout the mass of oxygen-bearing aluminum compound is not only in favorable condition for reaction therewith in promoting the formation of aluminum chloride in the last stage of distillation but also serves to hold the mass open or in porous condition, facilitating the access of the chloridizing agent thereto.

In the third stage of distillation, chlorine is admitted to the retort 11, for example, through pipes 18 and 17, and the heat of the retort is maintained at such degree as to produce a reaction between the oxygen-containing aluminum compound and the chlorine, together with the carbon present so as to produce aluminum chloride which passes through the conduit 16, valve 25 being opened and valves 23 and 24 being closed so as to conduct the aluminum chloride to a separate recovery means 22, this recovery means consisting, for example, of an electrical precipitator maintained at such temperature as to cause condensation and precipitation of the aluminum chloride. If desired, a cooler or condenser may be used in advance of the electrical precipitator to ensure condensation of the aluminum chloride as fume preparatory to the precipitation of said fume in the electrical precipitator.

The collected aluminum chloride may be drawn off in any suitable manner through the outlet 37 and the residual gases containing more or less carbon monoxide and the free chlorine are passed through the spray tower 38 wherein said gases are subjected to the action of lime-water, or similar basic reagent, producing calcium hypochlorite, which flows into the tank 43 and which may be converted into calcium chloride, or equivalent chloride or halide, by the addition of hydrochloric acid, or other halogen compound, added thereto through the supply means 44, the resulting calcium chloride or halide, being, if desired, pumped back to the mixer 7 for mixing with the supply of finely divided silicate material and carbonaceous material. Calcium chloride added in this manner to the mixture acts similarly to chlorine in effecting chloridization and volatilization of aluminum chloride, and by returning the calcium chloride to the cycle of operations, as stated, I am enabled to correspondingly reduce the amount of chlorine reagent. Calcium chloride, magnesium chloride, or similar halide, may also be added to the mixture in the first place in such quantitity as to more or less completely dispense with the use of free chlorine. The residual gases from the spray tower 38 consist largely of carbon monoxide, which may be utilized in any suitable manner, for example, by forcing same by pump 48 to burner 49 for the combustion chamber 12.

Any free chlorine produced in the operation of apparatus 43 (Fig. 1) may be returned to the retort 11, or otherwise utilized.

In the treatment of aluminum silicate rocks, or clays, which are substantially free from iron, the second stage of distillation above described for the removal of ferric chloride may be dispensed with.

In case the anhydrous aluminum chloride produced by my process is used in petroleum refining, or for similar organic reactions, the presence of anhydrous ferric chloride is not objectionable, and the second stage of distillation for the separate removal of iron, may, therefore, be omitted, even when the oxidized aluminum compound used contains considerable iron.

My invention may also be applied in connection with the use of other chloridizing or halidizing agents, for example, as indicated by the flow sheet in Fig. 2, salt may be added directly to the mixture of clay, or other aluminum silicate material, and coal, or other carbonaceous material, these three constituents being each finely ground and then intermixed and passed to the retort 11, the operation then proceeding as indicated by the flow sheet in the same manner as above described, except that a double chloride of sodium and aluminum is produced, which is collected and utilized in any suitable manner, for example, in the electrolytic production of metallic aluminum.

In place of chlorine or sodium chloride, other halogens, or a halide, may be used, for example, bromine, sodium bromide, calcium chloride, magnesium chloride, calcium fluoride, etc. Where an alkaline earth chloride, such as calcium chloride, is used, the reaction results in production of calcium silicate in the residue, and volatilization of aluminum chloride. The function of the carbon in the reacting mixture is, in this case, mainly to maintain a non-oxidizing atmosphere, so as to prevent decomposition of the aluminum chloride formed. In case sodium chloride is used as a chloridizing agent, a somewhat similar reaction may take place, sodium silicate being formed and a double chloride of sodium and aluminum being volatilized, so that in this case also the function of the carbon is mainly to maintain a non-oxidizing atmosphere. In case free chlorine is used as the chloridizing agent, the carbon acts as a reducing agent for the aluminum compound as well as preventing decomposition of the aluminum chloride formed. In any case the carbon present also acts as a means for maintaining the porosity of the mixture.

My invention may also be carried out in such manner as to dispense with the preliminary distillation of hydrocarbons, in case the amount of such hydrocarbons present is not sufficient to warrant recovery thereof. For example, finely divided coke may be intimately mixed with the clay or aluminum silicate material and the mixture subjected to heat in the presence of a chloridizing or halidizing agent, as above described, except that the first stage of distillation above described is omitted or is employed only to drive off water from the mixture. In this case, the separation of iron as ferric chloride and the condensation and collection of aluminum chloride, or other aluminum compound, may take place in the same manner as above described, and the residual gases may be treated as described for the separation and recovery of chlorine in the form of an alkaline earth chloride which is returned to the mixture for distillation, and in case the gases remaining after separation of the chlorine have a fuel value, they may be burned to produce heat for the distilling operation. The utilization of the residual gases as fuel for the distilling operation is of especial importance when free chlorine is used as a chloridizing agent, as the reaction then involves the production of an amount of carbon monoxide gas corresponding to the amount of aluminum chloride produced. For the purpose of accelerating the reaction and in order to ensure the production of carbon monoxide in the gases passing from the retort with a minimum amount of carbon dioxide, it is preferred to carry out the distilling operation for the production of aluminum chloride from the mixture of aluminum silicate material and carbon in the presence of a chloridizing agent, at a temperature of 1000° C., or over.

In order to utilize the carbon monoxide and chlorine, the gases passing from the distilling operation may, after removal of the aluminum chloride, be conducted to a second retort containing a mixture of aluminum silicate material and oxygen-bearing aluminum compound, and maintained at such temperature by external heating, if necessary, to provide for reaction between the said material and the said carbon monoxide, and a chloridizing agent, which is caused to be present, either as chlorine carried forward with the carbon monoxide from the first retort, or added to the second retort, either as free or combined chlorine. Aluminum chloride is thereby produced, which fumes off in the second retort, together with the gases resulting from the reaction, and is then condensed and collected, as above described. This operation may be carried on in an apparatus similar to that shown in Fig. 1 with the addition of another retort similar to retort 11 for receiving the carbon monoxide and chlorine resulting from the operation of the first retort, or, if desired, a mixture of carbon monoxide and chlorine passing, for example, from the precipitator 22 may be drawn through pipe 51 to a pump 52 and delivered back to the same retort 11, or one of the same bench or set of retorts. In this case the carbon monoxide resulting from the operation above described in retort 11 is returned and acts as a reducing agent and in connection with the chlorine present serves to effect the production and volatilization of an additional amount of aluminum chloride.

In all of the above described operations where the carbon monoxide resulting from the retorting of the clay, or similar material, and carbonaceous material is utilized as a fuel in the furnace for heating the retort, such utilization of the carbon monoxide is equally of advantage in connection with the retorting of naturally occurring mixtures of argillaceous and carbonaceous materials, such as oil shales, or low grade coals. In this respect, my invention includes the process consisting in reducing such naturally occurring mixtures to a suitable divided condition, heating such mixtures in a retort in the presence of a chloridizing agent in such manner as to produce aluminum chloride and a mixture of carbon monoxide and chlorine gas, and utilizing such carbon monoxide by oxidation thereof, either by way of combustion in the retorting furnace, or as a reducing agent in the retort itself. While, therefore, the formation of an artificial mixture of oxygen-containing aluminum compound and carbonaceous material is of value where a naturally occurring mixture is not available, my invention is not limited to the use of such artificial mixtures as far as regards the other features of the process, but includes the use of any mixture, whether natural or artificial, containing oxygen-bearing aluminum compound and carbonaceous material in proper proportions, the process being so carried out as to utilize the carbon monoxide remaining in the residual gases after separation of the aluminum chloride, such utilization of the carbon monoxide being either by combustion or by reaction in the retort and may be carried out either with or without preliminary separation of chlorine therefrom. In some cases, it may be desirable to subject the mixture of carbon monoxide and chlorine gases to a suitable catalytic agent, such as light, or finely divided carbon, to produce phosgene gas, which is then conducted to the retort 11, or to a similar retort, maintained at suitable temperature to cause reaction between the phosgene gas and the oxidized aluminum compound present to produce aluminum chloride. In this case, as well as in the case where the carbon monoxide and chlorine are used directly in a retort containing oxidized aluminum compound, the amount of carbon present with such compound may be reduced to a minimum, the reducing action being effected by carbon monoxide. It will be understood that the effluent gases from this secondary distilling operation using carbon monoxide as the reducing agent will contain carbon dioxide in a large proportion and will generally be discarded after separation of the aluminum chloride therefrom.

Instead of using free chlorine in carrying out my process, I may use an alkaline earth chloride, such as calcium chloride, or magnesium chloride, such chloride reacting with the mixture (either artificial or natural) of oxygen-containing aluminum compound and carbonaceous material to form aluminum chloride, the calcium content remaining in the residue, and the aluminum chloride being volatilized and collected as above described. The calcium chloride so used may be, in part at least, produced in the treatment of the gases and vapors passing from the retort, as above described. That part of my invention which relates to the recovery of the halogen from the residual gases by treatment of same by suitable reagents to form a halide, and returning such halide to the retorting operation, is also applicable in connection with the retorting of a natural mixture (such as oil shale, or slaty coal) of oxygen-containing aluminum compound and carbonaceous material, as well as to an artificial mixture of oxygen-bearing aluminum compound and carbonaceous material (such as coal, brea, peat, coke, etc.).

The phosgene gas produced, as above described, by treatment of the mixture of carbon monoxide and chlorine may be utilized for other purposes, or disposed of as a commercial product, if desired.

In making a mixture of oxygen-bearing aluminum compound and carbonaceous material for use in the process above described, I may utilize as the said carbonaceous material the residue of oil refining operations in which aluminum chloride has been used as a reagent. Such residues contain aluminum compound with carbonaceous material and may be mixed with a suitable additional quantity of oxygen-containing aluminum compound and then retorted in the presence of free chlorine, or other chloridizing agent, as above described, for the production of aluminum chloride, or other compounds of aluminum.

What I claim is:

1. The process which consists in subjecting a mixture of aluminum silicate material and carbonaceous material to heat to effect destructive distillation of the carbonaceous material, collecting the products so distilled, subjecting the residual mixture of aluminum silicate material and residual carbon to further heating action in the presence of a halidizing agent to produce and volatilize a halide compound of aluminum, separating such compound from the gases and vapors passing off therewith in the volatilization operation, and treating the residual gases with material capable of absorbing the halogen in such gases and vapors to form a halide and returning the halide so formed to the heating and volatilization stage of the cycle of operations.

2. The process which consists in subjecting a mixture of aluminum silicate material and carbonaceous material to heat to effect destructive distillation of the carbonaceous material, collecting the products so distilled, subjecting the residual mixture of aluminum silicate material and residual carbon to further heating action in the presence of a chloridizing agent to produce and volatilize aluminum chloride, separating such chloride from the gases and vapors passing off therewith in the volatilization operation, and treating the residual gases with material capable of absorbing the chlorine in such gases and vapors to form a chloride and returning the chloride so formed to the heating and volatilization stage of the cycle of operations.

3. The process which consists in subjecting aluminum silicate material and carbon to heat in the presence of chlorine to produce and drive off aluminum chloride, together with carbon monoxide and chlorine, treating the gases passing from such heating operation to remove chlorine therefrom, and utilizing the chlorine so removed to produce a further quantity of aluminum chloride by bringing the same into contact with heated aluminum silicate material and carbon.

4. The process which consists in subjecting a mixture of aluminum silicate material and carbonaceous material to heat to effect destructive distillation of the carbonaceous material, collecting the products so distilled, subjecting the residual material to the further action of heat in the presence of hydrochloric acid gas to volatilize and remove from the aluminum silicate material any iron contained therein, subjecting the residual mixture of aluminum silicate and carbon to heat in the presence of a chloridizing agent to produce and volatilize a chlorine compound of aluminum, and collecting such compound.

5. The process which consists in subjecting a mixture of oxygen-containing aluminum compound and carbon to heat in the presence of an excess of chlorine to produce and volatilize aluminum chloride, separating the aluminum chloride from the gases and vapors produced in the distilling operation, passing the remaining gases and vapors containing chlorine through lime water whereby calcium hypochlorite is formed, treating said hypochlorite with a halide to form a halogen compound and bringing said halogen compound in contact with a mixture of oxygen-containing aluminum compound and carbon heated in the presence of a chloridizing agent.

6. The process which consists in subjecting material, including an oxygen-containing compound of aluminum, together with carbon, to heat in the presence of a chloridizing agent, to produce and drive off aluminum chloride, subjecting the gases and vapors resulting from such operation to condensing and collecting operations to remove aluminum chloride therefrom, and passing residual gases and vapors containing residual chloridizing agent into contact with a further portion of material, including an oxygen-containing compound of aluminum, together with carbon, in heated condition to utilize said residual chloridizing agent in the production of a further quantity of aluminum chloride.

7. The process which consists in subjecting material comprising oxygen containing compound of aluminum, together with carbon, to heat in a retort in the presence of an excess of chlorine to produce and drive off gases containing aluminum chloride and chlorine, separating aluminum chloride from said gases, and recovering chlorine from said gases, and utilizing the chlorine so recovered in cyclic operation of the process.

8. In the manufacture of aluminum chlorid from bauxite and other forms of alumina with the aid of chlorin, the process which comprises employing in conjunction with the chlorin some of the waste gases of the operation itself.

9. In the manufacture of aluminum chlorid vapors from alumina, carbon and chlorin in a suitable reaction chamber, the process which comprises collecting the vapors and gases formed in the reaction, cooling to condense aluminum chlorid and returning a portion of the uncondensed gases to the reaction chamber.

10. In the manufacture of aluminum chlorid from alumina and chlorin in the presence of a reducing agent, the process which comprises cooling the effluent mixture of gases and vapors to condense aluminum chlorid therefrom and returning a portion of the residual gases to the reaction zone to accelerate the reaction of the chlorin upon the alumina.

11. In the manufacture of aluminum chlorid, the process that comprises reacting aluminous material with a chloridizing agent, separating the aluminum chlorid from the evolved vapors and cyclically returning uncondensed constituents to the reaction chamber.

12. The process of manufacturing aluminum chlorid that comprises treating aluminum silicate material with a chloridizing agent in the presence of a reducing agent, separating from the evolved vapors the aluminum chlorid produced and utilizing the remaining vapors for treating additional quantities of aluminum silicate material.

In testimony whereof I have hereunto subscribed my name this 5th day of April 1920.

EDSON R. WOLCOTT.